United States Patent [19]

Kuwabara et al.

[11] Patent Number: 4,800,006

[45] Date of Patent: Jan. 24, 1989

[54] ELECTROLYTIC FINISHING SYSTEM AND METHOD

[75] Inventors: Youhei Kuwabara, Fukuroi; Teruo Asaoka, Kakegawa; Masayoshi Moriya, Shizuoka; Yasuhiro Iwasaki, Mori; Haruki Sugiyama, Hamamatsu, all of Japan

[73] Assignee: Shizuoka Seiki Co., Ltd., Shizuoka, Japan

[21] Appl. No.: 111,237

[22] Filed: Oct. 22, 1987

[30] Foreign Application Priority Data

Oct. 30, 1986 [JP] Japan .................................. 61-257071
Feb. 9, 1987 [JP] Japan .................................. 62-027616
Apr. 23, 1987 [JP] Japan .................................. 62-100291

[51] Int. Cl.⁴ .................... B23H 3/10; B23H 11/00
[52] U.S. Cl. ............................. 204/129.43; 204/129.5; 204/129.7; 204/224 M; 204/225; 204/DIG. 9; 204/240
[58] Field of Search ........... 204/129.43, 129.5, 224 M, 204/225, 228, 237, DIG. 9, 240, 129.7

[56] References Cited

U.S. PATENT DOCUMENTS

| | | | |
|---|---|---|---|
| 3,371,022 | 2/1968 | Inoue | 204/238 X |
| 3,527,686 | 9/1970 | Inoue | 204/225 |
| 3,607,689 | 9/1971 | Inoue | 204/129.43 |
| 4,160,710 | 7/1979 | Greenwood | 204/225 X |
| 4,264,417 | 4/1981 | Vasiliev et al. | 204/225 X |

FOREIGN PATENT DOCUMENTS 1121116 10/1984 U.S.S.R. .................. 204/129.43

Primary Examiner—Donald R. Valentine
Attorney, Agent, or Firm—Armstrong, Nikaido, Marmelstein & Kubovcik

[57] ABSTRACT

An electrode is positioned with a predetermined gap between the electrode and a surface of a work in an electrolyte tank. Pulses are intermittently applied to the electrode. Electrolyte including residual products is discharged from the tank. The discharged electrolyte is cleaned by a filtering device to produce clean electrolyte. The clean electrolyte is supplied to the electrolyte tank for next machining.

7 Claims, 5 Drawing Sheets

ELECTROLYTIC FINISHING SYSTEM AND METHOD

BACKGROUND OF THE INVENTION

The present invention relates to a system for finishing a surface of a work by electrolytic machining, and more particulary to a system for finishing the surface having a three-dimensional shape.

In a conventional electrolytic machine, liquid electrolyte is passed between an electrode and a work at a high speed during machining, so that residual products such as particles of eroded metal from the work, hydrogen gas, and others are discharged from the gap between the electrode and the work. However, in the case of the work having a three-dimentional shaped recess, it is impossible to pass the liquid electrolyte through the gap having a complicated shape at a constant speed. The accuracy of the product is greatly influenced by the irregularities in electrolyte flow. In addition, the concentration of the electrolyte at an outlet of an electrolyte tank is different from the concentration at an inlet, even if the pressure of the liquid is increased. Accordingly, it is impossible to produce accurate products.

SUMMARY OF THE INVENTION

The object of the present invention is to provide an electrolytic finishing system which may finish a three-dimensional surface of a work to a product having a lustrous surface with accuracy at high speed.

According to the present invention, there is provided an electrolytic finishing system having an electrolyte tank, a supporting device for supporting an electrode adjacent a work secured in the electrolytic tank, and a driving device for moving the electrode with respect to the work.

The system comprises a first device for intermittently applying pulses to the electrode positioned with a predetermined gap between the electrode and a surface of the work, a second device for intermittently discharging electrolyte including residual products, a third device for cleaning the discharged electrolyte to produce clean electrolyte, and a fourth device for supplying the clean electrolyte to the electrolyte tank.

In an aspect of the present invention, the first device is arranged to apply pulses, each having a pulse duration in an early period of machining and, in a later period, to apply pulses, each having a longer pulse duration than the early period.

In another aspect, the first device is arranged to apply pulses, each having a current density in an early period and, in a later period, to apply pulses, each having a higher current density than the early period.

The system further comprises a fifth device for injecting the clean electrolyte to the gap between the work and the electrode, and the supply of the clean electrolyte is performed after the injection of the clean electrolyte.

The present invention further provides a method for finishing a work having a three-dimensional surface.

The method comprises positioning an electrode to form a predetermined gap between the electrode and the surface of the work, supplying electrolyte to an electrolyte tank so as to submerge the electrode and the work, intermittently applying pulses to the electrode, intermittently discharging the electrolyte including residual products, cleaning the discharged electrolyte to produce clean electrolyte, and re-supplying the clean electrolyte to the electrolyte tank before the application of a pulse.

The other objects and features of this invention will be apparently understood from the following description with reference to the accompanying drawings.

DETAILED DESCRIPTION OF THE PREFERRED EMBODIMENT

Figure 1:
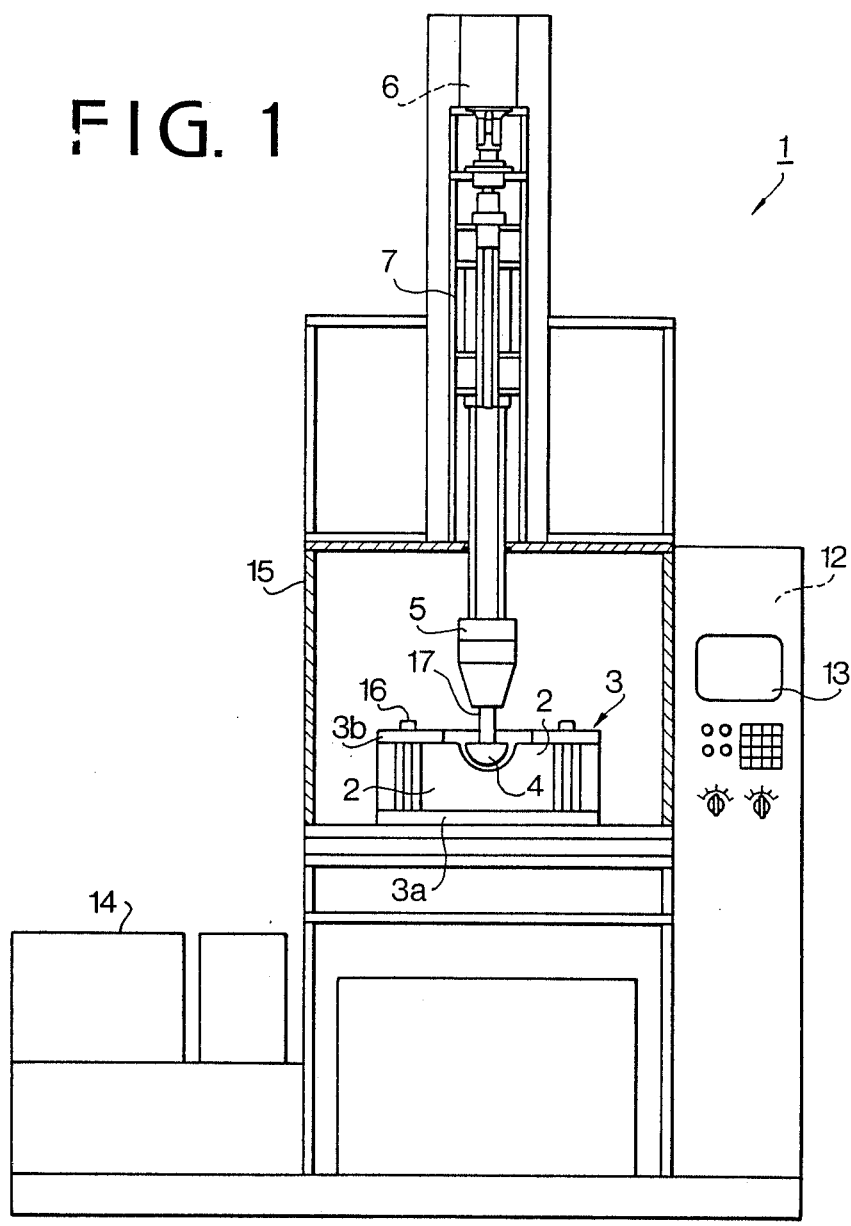
FIG. 1 is a front view of an electrolytic finishing machine according to the present invention.
Figure 2:
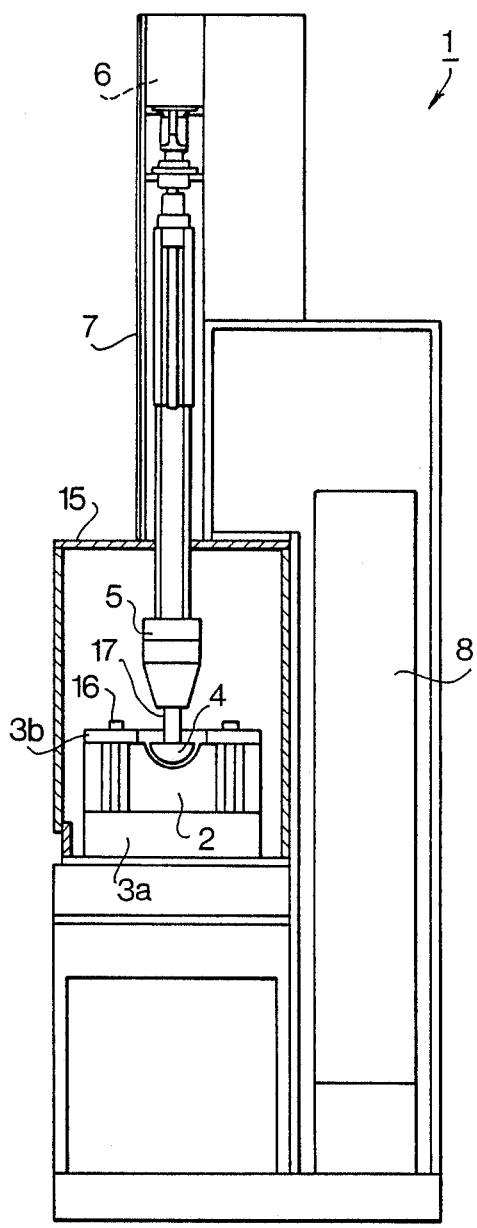
FIG. 2 is a side view of the machine.
Figure 3:
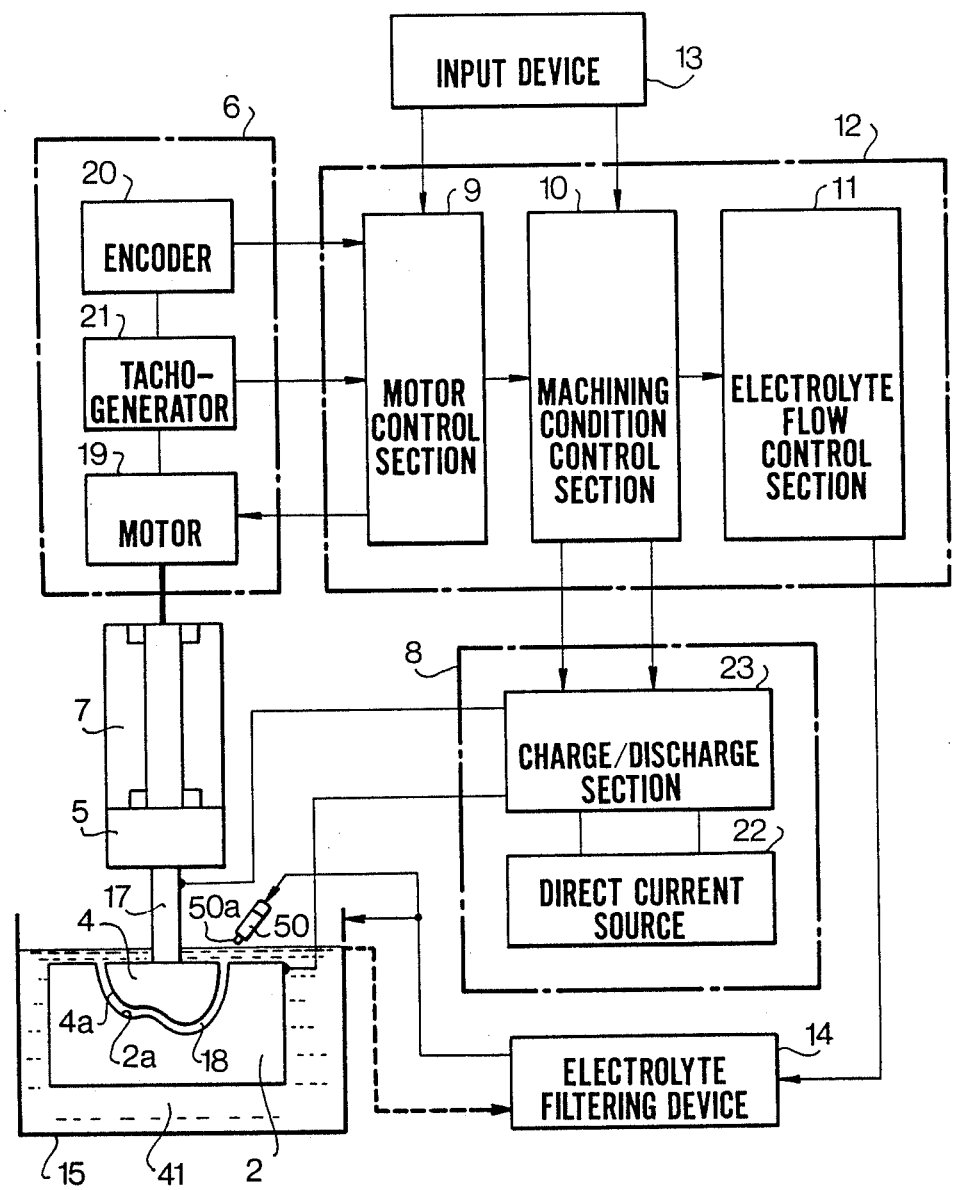
FIG. 3 is a block diagram showing a system of the present invention.

Referring to FIGS. 1 to 3, the electrolytic finishing machine 1 has a work fixing device 3 in an electrolyte tank 15. A work 2 is mounted on a base 3a of the device 3 and fixed thereto by an upper plate 3b and bolts 16 screwed in the base 3a. An electrode 4 is secured to the lower end of a rod 17 of an electrode holding device 5. The holding device is operatively connected to an electrode driving device 6 through an electrode driving direction converter 7. The converter 7 is arranged to change rotary output of a motor 19 in device 6 into axial movement of the rod 17.

The work 2 has a three-dimensional recess 2a to be finished, which has been formed by an electrical discharge machine (not shown) with the electrode 4.

As shown in FIG. 3, the driving device 6 has a rotary encoder 20, tacho-generator 21 and motor 19. Output signals of the encoder 20 and tacho-generator 21 are supplied to a motor control section 9 of a control unit 12, and motor 19 is operated by a control signal from the motor control section 9. The control unit has a machining condition control section 10 and an electrolyte flow control section 11.

The system has a power source device 8 which comprises a direct current source 22 and a charge/discharge section 23. The charge/discharge section 23 generates a pulse of a current density (specifically means "average current density") for a pulse duration dependent on the surface area of the recess 2a, in response to signals from the machining condition control section 10.

The system further has an input device 13 for inputting machining conditions, and an electrolyte filtering device 14.

Figure 4:
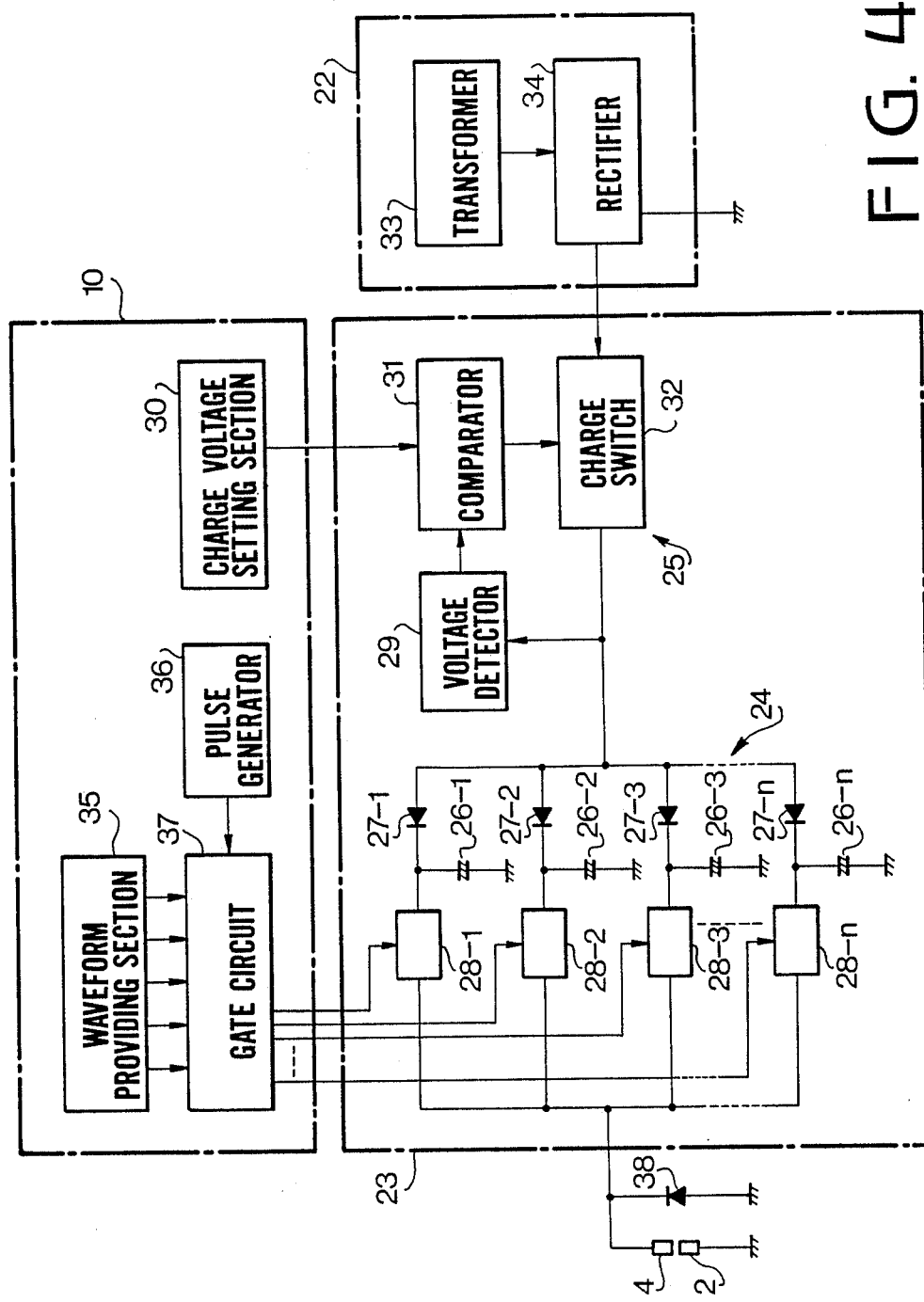
FIG. 4 is a block diagram showing a system for supplying current to an electrode.

Referring to FIG. 4, the charge/discharge section 23 has a discharge section 24 and a charge section 25. The discharge section 24 comprises a plurality of capacitors 26-1 to 26-n which are parallely connected with each other, diodes 27-1 to 27-n for preventing reverse current to the current source, and switches 28-1 to 28-n for generating pulses. The charge section 25 comprises a voltage detector 29 for detecting charge voltage applied to the capacitors 26-1 to 26-n, a comparator 31 for comparing a set voltage set at a charge voltage setting section 30 in machining condition control section 10 with the charge voltage detected by the voltage detector 29, and a charge switch 32 responsive to a signal from the comparator 31 for connecting the direct current source 22 to capacitors 26-1 to 26-n to charge each capacitor to a set value. The direct current source 22 comprises a transformer 33 and a rectifier 34.

The machining condition control section 10 comprises a waveform providing section 35 for providing current waveform discharged in a gap 18 between the work 2 and the electrode 4, a pulse generator 36 for generating pulses each having a predetermined pulse duration, a gate circuit 37 for supplying an operation signal to switches 28-1 to 28-n in response to signals from section 35 and generator 36, and charge voltage setting section 30. There is provided a diode 38 for preventing the switches 28-1 to 28-n from breaking down by reverse current.

The input device 13 is arranged to input various machining condition signals such as material of the work, surface area of the work, machining depth, grades of dimension accuracy, surface roughness, and dimension of the gap 18 between the electrode and the work. The signals are fed to the motor control section 9 and the machining condition control section 10

Figure 5:
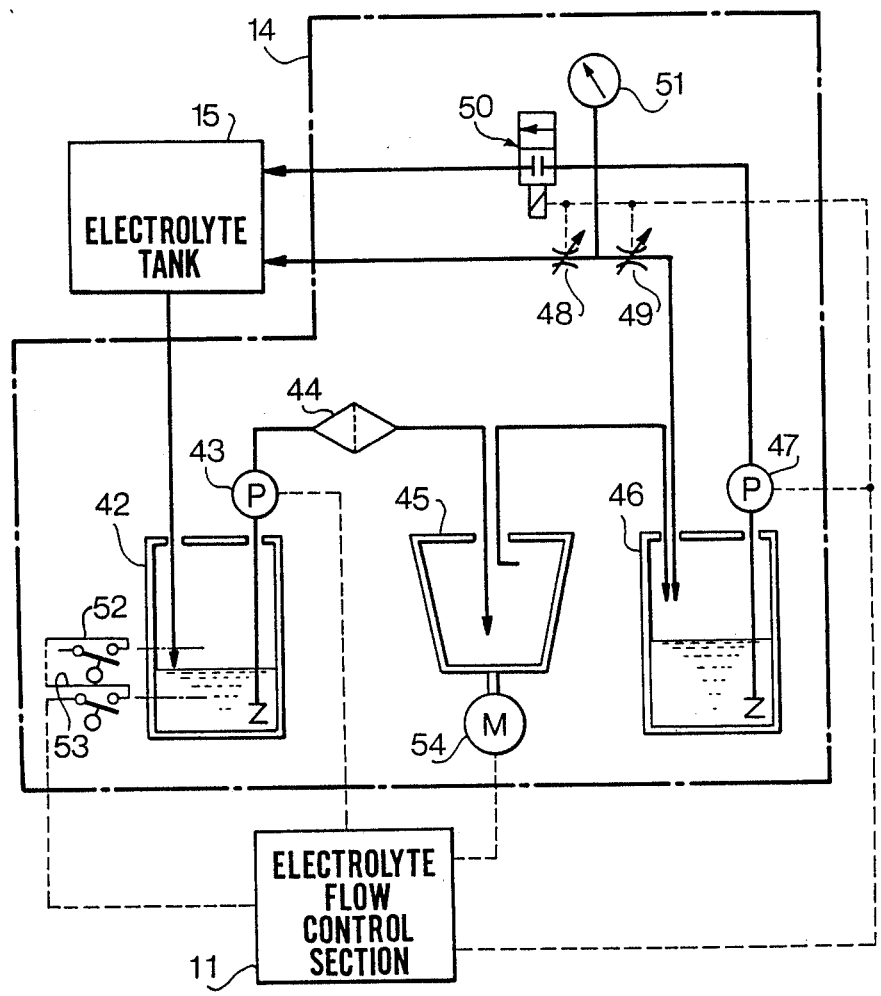
FIG. 5 is a block diagram showing a filtering system for liquid electrolyte.

Referring to FIG. 5, the electrolyte filtering device 14 comprises a dirty tank 42 for receiving electrolyte including residual products, which is removed from the electrolyte tank 15, a centrifugal separator 45 which is driven by a motor 54 to separate the electrolyte fed through a filter 44 from the dirty tank 42 by a pump 43, clean tank 46 storing clean electrolyte fed from the centrifugal separator 45, a pump 47 for feeding the electrolyte in the clean tank 46 to the electrolyte tank 15 through a solenoid operated valve 50, flow metering valves 48 and 49 for adjusting the pressure of electrolyte fed to the tank 15, and a pressure gauge 51. As shown in FIG. 3, the valve 50 has a nozzle 50a oriented to the gap 18. A pair of float switches 52 and 53 are provided for providing an upper and lower limits of electrolyte in the dirty tank 42.

The electrolyte flow control section 11 is arranged to control the flow metering valves 48 and 49 to keep the pressure constant and to control the solenoid operated valve 50 in response to signals from the machining condition control section 10.

The machining method of the work is described hereinafter. The position of the work 2 is adjusted by operating X and Y tables (not shown) to align the recess 2a with an electrode surface 4a. The electrode 4 is lowered by the driving device 6 to contact the work 2 and the position of the electrode is stored as an original position A. Thereafter the electrode is raised to provide a predetermined initial gap. Electrolyte 41 (FIG. 3) is supplied to the tank 15, and electrolytic machining is started. In an initial state, a pulse having a current density between 10A/cm$^2$ and 70A/cm$^2$ (for example 17A/cm$^2$) and a pulse duration shorter than 10 milli second (msec) is applied to the electrode 4 by the pulse generator 8. In accordance with machining conditions such as area of the surface to be machined, current density, the number of capacitors 26-1 to 26-n is selected. By the electrolytic process, projected portions on the surface of the recess 2a are eroded, so that the height of each projection may be reduced. After one or more pulses are applied, the electrode 4 is raised to expand the gap 18. The electrolyte 41 in the tank 15 is discharged to the dirty tank 42 together with residual products such as particles of eroded metal and hydrogen gas. At the same time as the discharge or after the discharge, the solenoid operated valve 50 is opened to inject clean electrolyte from the clean tank to the gap 18, thereby removing the residual products from the gap and the tank 15.

After the discharge of the electrolyte, the electrode 4 is lowered to contact the recess 2a and the position of the electrode 4 is stored. The stored position is compared with the original position A, so that the machining depth per one machining cycle (at every one or more pulses) is measured. Thereafter, the electrode 4 is raised again to form the predetermined gap and clean electrolyte is supplied to the tank 15 by the pump 47 passing through a line 47a and flow metering valve 48. Thus, the above described machining is repeated in accordance with signals from the control unit 12.

When the difference between the sum of machining depth and the input depth becomes a predetermined value with respect to the input depth, (for example 1 $\mu$m), the short pulse duration (less than 10 msec) is increased to a long pulse duration (between 10 msec and 60 msec) by the signal from the machining condition control section 10, and current density is also increased to a value higher than 30A/cm$^2$ and lower than 70A/cm$^2$. With the long pulse, the same electrolytic machining as the above described machining by the short pulse is performed.

By applying a short pulse of a lower current density, projections on the work surface are removed, and the surface are finished to a lustrous surface by a long pulse of higher current density. However, the same effect can be obtained by increasing only current density or only pulse duration.

Although the pulse change timing is detected by machining depth in the above method, it can also be detected by calculating the accumulated amount of the current in coulomb until the machining ends.

Figure 6A:
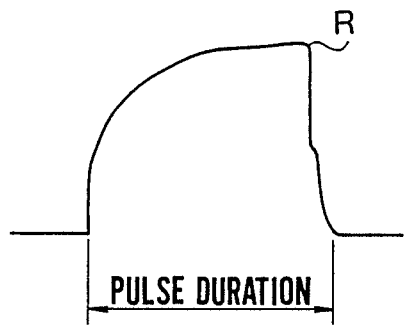
FIGS. 6a and 6b show waveforms of pulses.
Figure 6B:
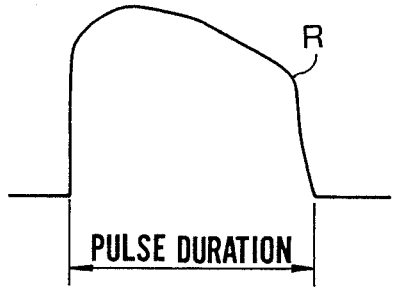

FIG. 6a shows a preferable pulse current density waveform. By keeping the current density at a rear portion R to a value higher than a set value, a lustrous surface can be obtained. As shown in FIG. 6b, if the current density at the R reduces, whole current density decreases, as a result lustrous surfaces can not be formed.

The operation of the electrolyte filtering device 14 will be described hereinafter. The level of the electrolyte in the dirty tank 42 is detected by float switches 52 and 53, and the detected level signal is applied to the electrolyte flow control section 11. When the level is between the switches, the control section 11 produces a signal which operates the pump 43 to transfer the electrolyte to the centrifugal separator 45 through filter 44. The centrifugal separator 45 is operated by the motor 54 to separate the residual products from the electrolyte. The clean electrolyte is stored in the clean tank 46. The electrolyte in the tank 46 is injected from the valve 50 to the tank 15 and supplied to the tank through the flow metering valve 48 as described above.

The pressure of liquid electrolyte supplied from the valve 48 is kept constant as described below. When the pressure measured by the pressure gauge 51 is lower than a set value of the electrolyte flow control section 11, the opening degree of the flow metering valve 48 is increased and the opening degree of the valve 49 in a return line is reduced, thereby increasing the pressure. When the measured pressure is higher than the set value, the opening degree of valve 48 is reduced and the opening degree of the valve 49 is increased. By keeping the pressure of electrolyte supplied to the tank 15, conditions of electrolyte, for example consumed time until the surface of the electrolyte becomes smooth, are maintained constant. Thus, the work is finished in high quality. As described above, the solenoid operated valve 50 injects the electrolyte into the gap 18 to remove the residual products in the gap together with the electrolyte.

EXAMPLE 1

Electrode: Copper
Stock: Tool steel (surface roughness of 20 μm)
Electrolyte: Sodium nitrate (concentration of 40%)

Pulse duration in early period: 3 msec
Current density in early period: 40A/cm²
Pulse duration in later period: 30 msec
Current density in later period: 40A/cm²

Finished surface roughness: Less than 1 μm
Finished surface: Lustrous surface

EXAMPLE 2

Electrode: Copper
Stock: Tool steel (surface roughness 23 μm)
Electrolyte: Sodium nitrate (concentration 30%)

Pulse duration in early period: 5 msec
Current density in early period: 17 A/cm²
Pulse duration in later period: 10 msec
Current density in later period: 50A/cm²

Finished surface roughness: Less than 3 μm

Finished surface: Lustrous surface

EXAMPLE 3

Electrode: Copper
Stock: Tool steel (surface roughness 20 μm)
Electrolyte: Sodium nitrate (concentration 40%)

Pulse duration in early period: 5 msec
Current density in early period: 17 A/cm²
Pulse duration in later period: 5 msec
Current density in later period: 40A/cm²

Finished surface roughness: Less than 3 μm
Finished surface: Lustrous surface

Although the pulse duration is changed once in the embodiment, it can be changed twice or more. For example, in early period, the pulse duration changed from 3 msec to 5 msec, and in later period, pulse duration is changed to three periods of 20 msec, 40 msec, and 60 msec. Similarly, current density can be preferably changed in several steps.

The present invention can be used for finishing works other than the metal work, such as silicon single crystal for manufacturing semiconductors, gallium aersenide stock, and others.

From the foregoing it will be understood that the electrolytic finishing is performed in stationary electrolyte by pulses. Accordingly, the machining is done under uniform concentration of electrolyte and constant condition during the electrolytic finishing, so that accurate products having high quality can be obtained. Since pulse duration and/or current density is increased in a later period of the process, the surface of the work can be finished to a lustrous surface.

While the presently preferred embodiment of the present invention has been shown and described, it is to be understood that this disclosure is for the purpose of illustration and that various changes and modifications may be made without departing from the spirit and scope of the invention as set forth in the appended claim.

What is claimed is:

1. An electrolytic finishing system comprising:
   an electrolyte tank containing an electrolyte;
   supporting means for supporting an electrode adjacent a work secured in the electrolyte tank;
   driving means for moving the electrode with respect to the work;
   first means for applying a pulse to the electrode, a predetermined gap being positioned between the electrode and a surface of the work;
   second means for injecting electrolyte into the predetermined gap to expel the electrolyte in the gap after at least one pulse from said first means, the electrolyte including residual products;
   third means for discharging the electrolyte from the electrolyte tank;
   fourth means for cleaning the discharged electrolyte to produce clean electrolyte; and
   fifth means for repeating operations of the first to fourth means;

2. The system according to claim 1 wherein the first means is arranged to apply pulses, each having a pulse duration in an early period of machining and, in a later period, to apply pulses, each having a longer pulse duration than the early period.

3. The system according to claim 1 wherein the first means is arranged to apply pulses, each having a current density in an early period and, in a later period, to apply pulses, each having a higher current density than the early period.

4. The system according to claim 1 wherein the second and third means function after several pulse applications.

5. The system according to claim 1 further comprising sixth means for keeping pressure of electrolyte supplied to the electrolyte tank constant.

6. A method for finishing a work having a three-dimensional surface comprising:
   positioning an electrode to form a predetermined gap between the electrode and the surface of the work;
   supplying electrolyte to an electrolyte tank so as to submerge the electrode and the work;
   applying a pulse to the electrode;
   injecting an electrolyte to the gap to expel the electrolyte in the gap after at least one pulse application;
   discharging the electrolyte including residual products from the electrolyte tank;
   cleaning the discharged electrolyte to produce clean electrolyte; and
   repeating said method.

7. The method according to claim 6 further comprising injecting the clean electrolyte to the gap after the discharge of the electrolyte.

* * * * *